Nov. 19, 1963    N. J. CAPRON ETAL    3,111,426
APPLICATION OF POLYVINYLIDENE FLUORIDE COATINGS
Filed Aug. 4, 1961
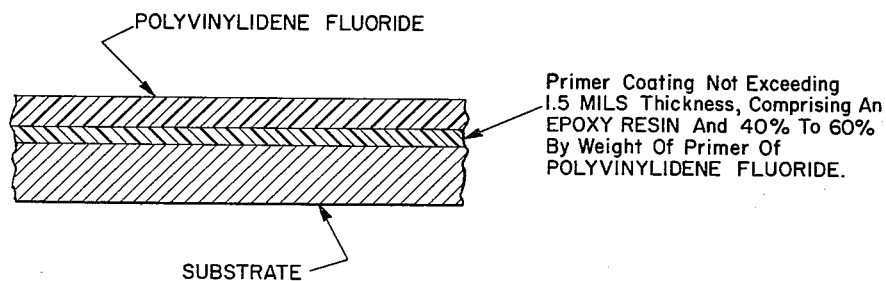
INVENTORS.
NICHOLAS J. CAPRON
ALKIS CHRISTOFAS
BY
AGENT

United States Patent Office 3,111,426
Patented Nov. 19, 1963

3,111,426
APPLICATION OF POLYVINYLIDENE FLUORIDE COATINGS
Nicholas J. Capron, deceased, late of Chalfont, Pa., by Sheila W. Capron, administratrix, Chalfont, Pa., and Alkis Christofas, Philadelphia, Pa., assignors to Pennsalt Chemicals Corporation, Philadelphia, Pa., a corporation of Pennsylvania
Filed Aug. 4, 1961, Ser. No. 129,941
10 Claims. (Cl. 117—75)

This invention deals with a novel process for applying coatings of vinylidene fluoride polymers to base substances, and with articles of manufacture so coated. In particular, the invention is concerned with novel primer systems comprising epoxy resins modified with polyvinylidene fluoride resin and such primer compositions also comprise an embodiment of the invention.

It is known in the art to employ epoxy type resins as primers for perfluorochloroolefin polymer coatings. For example, the disclosure of U.S. Patent 2,828,236 issued on March 25, 1958, in the name of Fred W. West teaches that perfluorochloroolefin polymers, including copolymers of perfluorochloroolefin polymers with vinylidene fluoride, can be coated onto surfaces by interposing between the coating and the base material a layer of an epoxy resin; i.e. the reaction product of epichlorohydrin and a polyhydric compound. Unfortunately, however, application of the techniques disclosed in U.S. 2,828,236 are not satisfactory for use with the homopolymer of vinylidene fluoride ($CH_2=CF_2$). Presumably, the relatively large chlorine atoms pendant from the backbone polymer of perfluorochloroolefins contribute in some way to successful bonding with epoxy resins, or, conversely, the —$CH_2$— group in vinylidene fluoride polymers adversely affects suitable bonding properties. At any rate, it is a fact that attempts to use epoxy resins as disclosed in the prior art leads to poor adhesion of the polyvinylidene fluoride film to the coated surface.

It has now been found, however, that excellent bonding of polyvinylidene fluoride resins can be achieved in accord with this invention. In one embodiment, the invention comprises the process of applying a coating of a vinylidene fluoride polymer to a surface by (1) applying a primer to said surface at a thickness not exceeding about 1.5 mils, said primer comprising (a) an epoxy resin and (b) from about 40% to about 60% by weight of said primer solids of polyvinylidene fluoride; (2) partially curing said primer coating; (3) applying a "dry spray" coating of vinylidene fluoride polymer and (4) curing said coated surface at 180° to 200° C.

A second embodiment of the invention is in providing a novel primer composition for use in bonding polyvinylidene fluoride to surfaces. Such primer composition comprises (a) an epoxy resin, particularly a condensation product of epichlorohydrin and a polyhydric alcohol, said condensation product having an epoxy equivalent at least about 150, and (b) from about 40% to about 60% by weight of said primer solids of polyvinylidene fluoride.

As a third embodiment, the invention includes articles of manufacture comprising a substrate base material, a coating of polyvinylidene fluoride and separating said polyvinylidene fluoride from said substrate base, a composition comprising an epoxy resin and from 40% to 60% by weight of said composition of polyvinylidene fluoride.

The drawing illustrates an embodiment of the invention.

The vinylidene fluoride polymer used in this invention is a well known polymer now enjoying commercial utility. Its preparation by free radical initiated polymerization (e.g. with peroxide or persulfate) is fully disclosed and its properties given in U.S. Patent 2,435,537 which issued February 3, 1948, in the names of Thomas A. Ford and William E. Hanford.

The epoxy resins used in the invention are prepared by reacting epichlorohydrin and epichlorohydrin derivatives with polyhydric compounds. Among the polyhydric compounds which may be employed are alcohols such as mannitol, sorbitol, erythritol, pentaerythritol and polyallyl alcohol; trihydric alcohols, such as glycerol and trimethylol propane; dihydric phenols such as bisphenol (p,p-dihydroxydiphenyldimethyl methane) and trihydric phenols. Because of their greater bond strength, higher chemical resistance and availability, epoxide resins prepared by the condensation of bisphenol and epichlorohydrin are preferred. The degree of polymerization can be expressed by the "epoxy equivalent" which is defined as the weight of resin in grams containing one gram equivalent of epoxy groups. Under this definition, the adhesives of this invention should have an epoxy equivalent of at least 150. The epoxy equivalent of the adhesives of this invention should preferably not exceed about 3400. These epoxide resins are commercially available as "Epon," "Epi Rez" and "Araldite" resins. The condensation of bisphenol and epichlorohydrin is effected in the presence of NaOH. During the condensation, NaCl or HCl is split off to form a condensation product. These epoxy condensation products are prepared in liquid and in solid form and have a melting point ranging from at least 0° C. to about 170° C.

To make up the primer composition of this invention, polyvinylidene fluoride and the epoxy resin are mixed and thoroughly dispersed. Preferably, in order to make such dispersion, the polyvinylidene fluoride in the form of fine powder is first dispersed in a diluent and the epoxy resin added with stirring. The diluent also serves to aid the application of the primer to the surface to be coated. The diluents used will usually be those in which the epoxy is soluble. Such diluents are preferably ketones and include acetone, methylethylketone, cyclohexanone, diisobutylketone, methylisobutylketone, and the like. Frequently, it is desirable to add an additional solvent to aid dispersibility or solubility of other components which may be present in the primer system and such solvents may be the usual organic solvents such as aromatic hydrocarbons (e.g. benzene, the toluenes, the xylenes, etc.), alcohols (e.g. ethanol, n-propanol, isopropanol, n-butanol, isobutanol, etc.) and the like. The amount of polyvinylidene fluoride in the primer composition will be, as already indicated, from about 40% to about 60% by weight of the primer solids, the preferred amount being between about 45% and 55%. When below about 40% of polyvinylidene fluoride is used in the primer, generally poor adhesion of the top coating to the primer is obtained. When using above about 60% the adhesion of the primer coating to the substrate is weakened. Thus, this concentration range is critical.

The primer composition as prepared above is a light yellow or cream-colored, opaque dispersion which is stable to storage at ambient temperatures. After catalyst is added (as discussed below) the primer must be used promptly or curing will occur and render it unworkable.

The primer composition can be applied directly by brush, dip or spray technique and preferably it will be applied as a dispersion from the ketone solvents mentioned above. It is essential that a curing catalyst be incorporated as is customary with epoxy resin systems. Curing catalysts which can be employed include: the diisocyanates, e.g. methylene bis-(4-phenyl) isocyanate, dialdehydes, e.g. glyoxal, dimercaptans and amines. Most preferred as curing agents, however, are liquid and semiliquid polyamides which give increased flexibility to the bond obtained. These polyamides are usually employed in quantities from 40% to 100% of the epoxy resin weight, the higher amounts being used when extremely high impact strength and resilience are desired. These polyamides are well known materials and their preparation by condensation of dimeric fatty acids with polyamines is given in U.S. 2,379,413. Commercial polyamide products include Versamid 100, 115, 125 and 140 made by General Mills, Inc. Still another class of epoxy catalysts includes liquid polysulfides commercially available from Thiokol Corporation as LP 38, LP 8, LP 33, LP 31, LP 32 and LP 2. These materials are usually used in amounts up to about 200% of the epoxy resin in conjunction with liquid amines. These and other conventional catalysts which may also be used are discussed by Elliott N. Dorman in his article appearing on page 213 of the May 1955 issue of Plastics Technology. Also of particular value are the use of N-lower alkylalkanolamines (e.g. ethylaminoethanol, methylaminoethanol, etc.) together with polyamide catalysts which results in improved adhesion. This is believed due to the wetting of the bonded surface by the alkanolamine which promotes more uniform bonding at the surfaces.

It will be understood that the epoxy catalyst will be incorporated into the primer composition just prior to use. With polyamide catalysts pot life is about 6 to 8 hours at room temperature when diluted with solvents to a solids content of about 50% to 60% by weight. If held under refrigeration (e.g. 32° to 40° F.), however, pot life can be increased to over 24 hours. Application of the primer is made onto the surface to be coated at a thickness not exceeding 1.5 mils. If this thickness is exceeded a weaker bond is obtained and peeling of the coating is often experienced. Usually the thickness of the primer film will be between about 0.5 mil and 1.5 mils, and preferably about 1 mil. The primer is then partially cured until it reaches a slightly tacky stage. Curing is accomplished with the aid of heat and a temperature between about 100° C. and 150° C. will normally be employed. The cure of the primer is only a partial cure, however, and must be stopped when the epoxy is still at a tacky stage. At the temperatures given above this will usually require from about 5 to about 15 minutes of curing time, it being understood that the time is inversely related to temperature and that the exact time and temperature will be dependent to some extent upon the thickness and composition of the substrate.

The term "tacky" stage as used herein refers to a partial cure of the epoxy resin to a point before the well known "B stage" or "tack free" stage of epoxy resin terminology. After the primer is brought to the tacky stage by the partial curing procedure the primer is ready for the coating of polyvinylidene fluoride. This coating is applied from a dispersion using an organic liquid system. The organic liquid dispersants which are particularly useful in forming dispersions of vinylidene fluoride polymers are high boiling organic liquids which are latent solvents for the vinylidene fluoride polymers. The term "latent solvents" means those solvents which are liquids which at elevated temperatures do dissolve the polymer, but at room temperature are without solvent effects. Such liquids include tetraethylurea, diethyladipate, diethylsuccinate, dimethylphthalate, diethylphthalate, diethyloxalate, triethylphosphate, diethylformamide, dimethylsuccinate and propylene carbonate. Generally, the boiling points of these solvents will range from 160–300° C. A solvent having a boiling point in excess of 300° C. would be undesirable because of the extremely high boiling temperature which may degrade the films which are being prepared. The dispersions are formulated to contain from 5% to 60% solids and are of a sprayable viscosity at room temperature. Single spray applications of this type of dispersion will permit the formation of films and coatings of 5 to 15 mils thickness in a single spray application. To prepare these dispersions, the polymer from the polymerizer is filtered, washed and dried in conventional drying equipment, and it is then ready for formulation in the organic latent solvent. For most satisfactory results the polymer should have a particle size of 0.5 to 30 microns, but a particle size as high as 40 microns is usable. The dispersions are prepared by placing the organic latent solvent in a blending apparatus and adding the required amount of polymer powder. Proper mixing of latent solvent and polymer can be accomplished in a paint mill, colloid mill or a high speed blending apparatus. These dispersions have a viscosity at room temperature sufficiently low to permit spraying of a 40% to 60% solids system. The desired viscosity will, of course, depend upon the particular spray equipment used.

In general, the dispersion viscosity can be regulated by varying the solids content of the dispersion. If desired, other organic diluents which have no latent solvating action on the vinylidene fluoride polymer may be added to control dispersion viscosity or for other purposes. Organic diluents which may be added to control viscosity are xylene, acetone, dioxane, methylethylketone, methylisobutylketone, methylhexylketone, tetrahydrofuran, methylamylketone, diisobutylketone, etc. The amount of diluent added will be determined by the viscosity required for the particular application. In general, the amount of diluent may vary from 5% to 50% of the total weight.

After the high temperature organic solvent and polymer powder have been mixed and a stable suspension is formed, the mixture is deaerated and is then ready for application by spraying. The coated material is then inserted in an oven and the drying cycle begun.

The spraying procedure for the first spray coat over the primer is critical and requires that the spray be "dry," by which is meant that the spray gun is held relatively far from the substrate so as to obtain an almost dry powder coating. The term "dry spray" is well understood in the coatings field and is distinguished from a normal or "wet" spray where substantial amounts of liquid dispersant are deposited on the surface sprayed. This "dry" spray is necessary to avoid the adverse effect of excessive solvent from the polyvinylidene fluoride dispersion on the partially cured primer. The "dry" coating obtained at this point has a grainy, satin-like uniform appearance. It is to be understood, however, that only the coat directly on the primer coat need be "dry." Subsequent coats of the polyvinylidene fluoride resin used to build up coating thickness do not require this control.

After the dispersions of the vinylidene fluoride polymer are applied the coated object is passed into a heated chamber where the final cure is carried out at a temperature between about 180° C. and 200° C., preferably about 180° C. This drying temperature (i.e. 180° C.) is the first order transition temperature or the crystalline melting point for the polyvinylidene fluoride and this temperature is used in order to melt the polymer and remove the high temperature solvent. Temperatures considerably higher than 180° C. should not be used for long periods of time because such temperatures, exceeding the first order transition temperature, can cause changes in polymer properties. However, temperatures as high as 300° C. can be tolerated for short periods of time. After curing, the coating and its substrate can then be quenched in water or slowly cooled in air depending on the end use of the coated article thus prepared.

Since the solids content of these dispersions may be varied widely, it is possible to obtain any thickness of film or coating up to 15 mils in one application.

In order to further illustrate the invention the following examples are given:

EXAMPLE 1

A primer system was prepared by mixing 50 g. of polyvinylidene fluoride powder with 50 g. of methylethylketone in an electric blender. Then a mixture of 37.5 g. of an epoxy resin (made by condensation of bisphenol with epichlorohydrin and having an epoxy equivalent of 191) and 12.5 g. of a polyamide resin having an amine value of 290–320 and a Brookfield viscosity at 75° C. of 7 to 9 (Versamid 125) was added and blended into the dispersion. The resulting dispersion was sprayed onto a sandblasted steel panel at a thickness of 1 mil. The coating was cured by first allowing the solvent to evaporate at room temperature and then holding the panel at 100° C. for five minutes after which time the coating was tacky.

Then a dispersion consisting of 49 g. of polyvinylidene fluoride, 42 g. of diethylphosphate, and 18 g. of diisobutylketone was sprayed onto the tacky panel, the sprayed film being nearly "dry." The thickness of the sprayed film was approximately 1 mil and the spray gun was operated at 16" to 18" from the panel and at an air pressure below 35 p.s.i. The coating was cured at 180° to 200° C.

On testing, the coating was judged to be very good. It showed no delamination when bent over a ¼" diameter mandrel; it was resistant to steam under pressure; it was satisfactory to a reverse impact test, and was resistant to boiling in 10% NaOH.

On the other hand, when the polyvinylidene fluoride was omitted from the primer composition the film showed delamination to high pressure steam, had poor resistance to boiling caustic, and was judged to be only a fair coating.

Likewise, when the primer coat containing the polyvinylidene fluoride was applied at a thickness above 2 mils the final coating flaked off and was unsatisfactory.

EXAMPLE 2

The panel prepared according to Example 1 was given additional coatings with a dispersion consisting of 40 g. of polyvinylidene fluoride, 42 g. of propylene carbonate and 18 g. of diisobutylketone. The coating was cured at 180° to 200° C. and a third coating applied and cured. The coated metal was tested and judged to have very good properties thus showing the ability to build up polyvinylidene fluoride layers up to any desired thickness.

Example 1 was repeated except that the amount of polyvinylidene fluoride in the primer was varied. The following table indicates the polyvinylidene content of the primer and its effect on the binding properties:

*Table I*

EXAMPLE 3

| Polyvinylidene Fluoride in Primer, Percent by Weight on Primer Solids | Effect on Binding Properties |
| --- | --- |
| 30 | Excellent adhesion of primer to metal, but poor adhesion of polyvinylidene fluoride film to primer. |
| 40 | Excellent adhesion of both primer to metal and polyvinylidene fluoride film to primer. Mandrel and reverse impact tests and steam and caustic resistance very good to excellent. |
| 50 | Do. |
| 60 | Do. |
| 70 | Excellent adhesion of polyvinylidene to primer, but poor adhesion of primer to substrate. |
| 80 | Do. |
| 90 | Do. |

EXAMPLE 4

A dispersion of 210 g. of polyvinylidene fluoride powder having a particle size distribution of 70% to 80% below 2 microns with particles up to 30 microns being present in trace amounts was prepared in 250 g. of methylisobutylketone. Then, 150 g. of an epoxy resin having an epoxy equivalent of 185 to 196 (Araldite 6010) and prepared from bisphenol and epichlorohydrin was mixed into the dispersion. This primer composition is a yellowish, opaque, liquid which is storage stable. It is suitable as an article of commerce and is ready for use upon addition of catalyst.

The curing catalyst was prepared by dispersing 60 g. of the polyamide resin used in Example 1 in 40 g. of methylisobutylketone. Then 90 g. of the above primer composition and 20 g. of the catalyst dispersion were mixed, and 10/10 steel panels (40 mils thick) dipped into the liquid to apply a 0.0005" (½ mil) film. The film was cured at 100° to 130° C. for 5 minutes to give a tacky film. The tacky resin was then sprayed with a dispersion of 20 g. of polyvinylidene fluoride in 80 g. of isopropanol to give a "dry" film of 1 mil thickness. The film was cured at 180° to 200° C. and two subsequent coatings were applied and cured. These top coatings were made with dispersions of 50% by weight of polyvinylidene fluoride in a mixture of 70 parts by weight of dimethylphthalate and 30 parts of diisobutylketone. The finished panel was satisfactory in all evaluation tests made.

EXAMPLE 5

A dispersion of 210 g. polyvinylidene fluoride powder (particle size distribution 70% to 80% below 2 microns) was prepared in 250 g. of methylisobutylketone and the epoxy resin used in Example 4 was added.

The catalyst was prepared by mixing 70 grams of the polyamide resin used in Example 1 with 30 grams of ethylaminoethanol. Then 60 g. of this mixture was dissolved in 40 g. of methylisobutylketone to provide the catalyst solution. Then, 90 g. of the above primer composition and 20 g. of the catalyst solution were mixed and used to coat 10/10 steel panels as in Example 4. The addition of the ethylaminoethanol improves the wetting of the bonded surfaces by the primer and produced improved adhesion resulting in an excellent bond.

EXAMPLE 6

A dispersion of polyvinylidene fluoride in methylisobutylketone was prepared and the epoxy resin was added as in Example 4. The catalyst was prepared by mixing 33 g. of Thiokol LP 3 with 12.10 g. triethylenetetramine and 54.9 g. methylisobutylketone.

For use, 90 g. of the above primer composition and 20 g. of the catalyst solution were mixed immediately and 10/10 steel panels were coated as in Example 4. The finished panels were satisfactory with regard to bond strength and all other evaluation tests.

EXAMPLE 7

A primer and catalyst were prepared as described in Example 4 and applied by spraying as described in Example 1 on (a) piece of Pyrex glass 3/16" x 6" x 6"
(b) piece of oak board ¼" x 6" x 6"

The panels were treated and coated with polyvinylidene resin dispersion as described in Example 1. Satisfactory adhesion of the film was observed in each instance.

It will be understood that the above description and examples are illustrative only and that numerous variations may be made from them without departing from the spirit and scope of the invention.

We claim:

1. A process for applying a coating of a vinylidene fluoride polymer to a surface which comprises (1) applying a primer to said surface at a thickness not exceeding 1.5 mils, said primer comprising (a) an epoxy resin, and (b) from about 40% to about 60% by weight of said primer solids of polyvinylidene fluoride; (2) partially curing said primer coating to a tacky stage; (3) applying a "dry" spray coating of a dispersion of said vinylidene fluoride polymer in a latent solvent; and (4) curing said coated surface.

2. A process for applying a coating of a vinylidene fluoride polymer to a surface which comprises (1) applying a primer to said surface at a thickness not exceeding 1.5 mils, said primer comprising (a) a condensation product of epichlorohydrin and a polyhydric compound, said condensation product having an epoxy equivalent of at least about 150, and (b) from about 40% to about 60% by weight of said primer solids of polyvinylidene fluoride; (2) partially curing said primer coating to a tacky stage; (3) applying a "dry" spray coating of a dispersion of said vinylidene fluoride polymer in a high boiling organic liquid; and (4) curing said coated surface at 180° to 200° C.

3. The process of claim 2 wherein the surface is metal.
4. The process of claim 2 wherein the surface is steel.
5. The process of claim 2 wherein the curing catalyst is a polyamide resin.
6. The process of claim 2 wherein the curing catalyst is a mixture of a polyamide resin and an N-lower alkyl-alkanolamine.
7. The process of claim 6 wherein the curing catalyst is a mixture of a polyamide resin and ethylaminoethanol.
8. A primer composition for applying a vinylidene fluoride polymer to a surface consisting essentially of a dispersion in an inert solvent of an epoxy resin having an epoxy equivalent between about 150 and 3400 and from about 40% to 60% by weight of said primer solids of the homopolymer of vinylidene fluoride.
9. An article of manufacture comprising a base material surface and a polyvinylidene fluoride surface and interposed between said surfaces as a binder, a composition comprising an epoxy resin and from about 40% to 60% by weight of said composition of polyvinylidene fluoride.
10. The article of claim 9 wherein the base material is a metal.

References Cited in the file of this patent
UNITED STATES PATENTS

| | | |
|---|---|---|
| 2,707,157 | Stanton et al. | Apr. 26, 1955 |
| 2,777,783 | Welch | Jan. 15, 1957 |
| 2,794,010 | Jackson | May 28, 1957 |
| 2,976,257 | Dawe et al. | Mar. 21, 1961 |
| 2,979,418 | Dipner | Apr. 11, 1961 |